United States Patent
Dumazert et al.

(10) Patent No.: US 12,111,432 B2
(45) Date of Patent: Oct. 8, 2024

(54) SYSTEM FOR MEASURING FAST NEUTRON FLUENCE FOR A NUCLEAR REACTOR, ASSOCIATED INSTALLATION, MEASUREMENT METHOD AND COMPUTER PROGRAM PRODUCT

(71) Applicant: COMMISSARIAT A L'ENERGIE ATOMIQUE ET AUX ENERGIES ALTERNATIVES, Paris (FR)

(72) Inventors: Jonathan Dumazert, Ales (FR); Sylvain Magne, Chatillon (FR); Romain Coulon, Montrouge (FR); Guillaume Laffont, Meudon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 287 days.

(21) Appl. No.: 17/789,545

(22) PCT Filed: Dec. 29, 2020

(86) PCT No.: PCT/FR2020/052636
§ 371 (c)(1),
(2) Date: Jun. 28, 2022

(87) PCT Pub. No.: WO2021/136915
PCT Pub. Date: Jul. 8, 2021

(65) Prior Publication Data
US 2023/0017787 A1 Jan. 19, 2023

(30) Foreign Application Priority Data
Dec. 30, 2019 (FR) ...................... 19 15725

(51) Int. Cl.
*G01T 3/00* (2006.01)
*G01N 23/222* (2006.01)
*G21C 17/108* (2006.01)

(52) U.S. Cl.
CPC .......... *G01T 3/006* (2013.01); *G01N 23/222* (2013.01); *G21C 17/108* (2013.01)

(58) Field of Classification Search
CPC ......... G01T 3/006; G01T 3/00; G01N 23/222; G21C 17/108; Y02E 30/30
See application file for complete search history.

(56) References Cited

U.S. PATENT DOCUMENTS

2006/0249664 A1* 11/2006 Beinhocker ............ G01N 21/21
250/227.15
2014/0061487 A1 3/2014 Withers et al.

FOREIGN PATENT DOCUMENTS

JP 9-218270 A 8/1997

OTHER PUBLICATIONS

International Search Report issued Apr. 19, 2021 in PCT/FR2020/052636, filed on Dec. 29, 2020, 2 pages.

* cited by examiner

*Primary Examiner* — David P Porta
*Assistant Examiner* — Meenakshi S Sahu
(74) *Attorney, Agent, or Firm* — Oblon, McClelland, Maier & Neustadt, L.L.P.

(57) ABSTRACT

A measuring system includes a detector having an optical waveguide including a primary dopant capable of transmuting, by neutron capture, into a stable secondary dopant that is less neutron-absorbent than the primary dopant, a moderation layer suitable for slowing down fast neutrons, and an analysis device connected to the detector. The analysis device is configured to inject, into the waveguide, an interrogation wave having a wavelength corresponding to an (Continued)

absorption peak of the secondary dopant, detect a response wave emitted by the waveguide, calculate, from the detected response wave, a piece of information relating to a concentration of secondary dopant in the waveguide, and, based on the information relating to the calculated concentration of secondary dopant, determine a fluence of fast neutrons during a predetermined secondary period.

15 Claims, 3 Drawing Sheets

SYSTEM FOR MEASURING FAST NEUTRON FLUENCE FOR A NUCLEAR REACTOR, ASSOCIATED INSTALLATION, MEASUREMENT METHOD AND COMPUTER PROGRAM PRODUCT

TECHNICAL FIELD

The present invention relates to a system for measuring fast neutron fluence. The invention also relates to an installation comprising such a measurement system, a method for measuring such a fast neutron fluence, and an associated computer program product.

The invention applies to the field of nuclear instrumentation for reactors, more specifically ex-core neutron measurement (that is to say outside a vessel housing the reactor core).

PRIOR ART

A Pressurised Water Reactor (PWR) is designed to operate for a minimum operational life of approximately 40 years (likely to reach 60 years).

Conventionally, such a nuclear reactor comprises a vessel comprising a wall made of steel and housing the core of the reactor. However, the steel of this wall undergoes degradation during the operation of the reactor, due to its interaction with fast neutrons generated by the core, which cause atomic displacements in this steel. For example, the fast neutron fluence in the vessel is around $10^{13}$ n·cm$^{-2}$·s$^{-1}$ (neutrons per square centimetre per second), the dose rate being around $10^7$ Gy/h (gray per hour).

By "fast neutron", it is understood, within the meaning of the present invention, a neutron having an energy greater than or equal to 1 MeV (megaelectronvolt).

A satisfactory estimate of the aging of the vessel wall according to the criteria imposed by the safety authorities, for example the ASN in France (acronym of "Nuclear Safety Authority") therefore requires reliably measuring the fast neutron fluence experienced by the vessel wall.

To this end, it is known to use niobium film dosimeters encapsulated in an aluminium case to carry out such a measurement.

Such dosimeters are placed on an external surface of the vessel and are activated by neutron radiation from the reactor core. The $^{93}$Nb (n, n') $^{93m}$Nb reaction of niobium having an energy activation threshold comparable to the degradation threshold of steels (approximately 0.9 MeV), the data determined from such dosimeters have a good representativeness of the fast neutron fluence experienced by the wall. Furthermore, the half-life of metastable niobium is 16.1 years, which allows measurement during each ten-year inspection to the reactor.

Nevertheless, such niobium film dosimeters are not entirely satisfactory.

Indeed, such dosimeters are quasi-punctual, so that it is generally necessary to distribute a large number of them on the wall of the vessel in order to establish a satisfactory mapping of the fast neutron fluence at the wall.

Furthermore, to obtain a fluence piece of information from such dosimeters, it is necessary to collect them and then prepare them for processing by a service specialising in gamma measurement on thin films, which requires long and meticulous, and therefore expensive preparation. Finally, the piece of information is only available at each ten-year inspection.

A purpose of the invention is therefore to propose a measurement system which allows cartographic monitoring of the spatial distribution of fast neutron fluence integrated over a predetermined period, whose use and maintenance are simple, which is robust, and which has low operating costs.

DISCLOSURE OF THE INVENTION

To this end, the object of the invention is a measurement system of the aforementioned type, comprising at least one detector and an analysis device connected to each detector, each detector comprising:

an optical waveguide including a primary dopant capable of transmuting, by neutron capture, into a secondary dopant, the secondary dopant having an atomic number different from that of the primary dopant, the secondary dopant being stable and being less neutron-absorbent than the primary dopant;

a moderation layer suitable for slowing down fast neutrons and intended to be arranged between the optical waveguide and an external surface of a wall of a reactor vessel;

the analysis device being configured, for each detector, so as to:

inject, into the corresponding optical waveguide, a secondary interrogation wave having a secondary wavelength at which the secondary dopant has an absorption peak, the smallest difference between the secondary wavelength and a wavelength corresponding to an absorption peak of the primary dopant being greater than or equal to a first predetermined minimum difference;

detect a secondary response wave emitted by the corresponding optical waveguide from the secondary interrogation wave;

calculate, from the detected secondary response wave, a piece of information relating to a concentration of secondary dopant in the corresponding optical waveguide; and based on the piece of information relating to the calculated concentration of secondary dopant, and conversion data relating to the nuclear reactor, determine a fast neutron fluence experienced by the wall of the vessel for a predetermined secondary period.

Indeed, the measurement of the concentration of the secondary dopant, related to that of the primary dopant (known by manufacture), allows to obtain, selectively, the evolution of the neutron fluence during the operation of the reactor. Due to the choice of the secondary wavelength, the access to the concentration of the secondary dopant is accessible via the secondary response wave. Furthermore, thanks to such a choice, the contribution of the primary dopant to the secondary response wave is likely to be easily subtracted.

Furthermore, the use of a primary dopant with high neutron-absorbance and stable progeny, preferably thulium and/or europium, allows continuous operation over long periods, typically sixty years, without saturation: no replacement of the detector during the reactor life is thus required.

Furthermore, such a measurement system is able to provide a reliable in-core (that is to say in the vessel) measurement of the neutron fluence, although the detector is placed on an external surface of the wall of the vessel, at which the irradiation conditions are less severe than on its internal surface. Thus, the deployment of the measurement system according to the invention poses fewer difficulties than an in-core instrumentation.

Moreover, the use of waveguides allows a determination of fluence profiles along each of said guides. A cartographic monitoring of the spatial distribution of fast neutron fluence integrated over time is thus accessible, which allows a study of the aging of the entire vessel, and the detection of neutron flux asymmetries.

According to other advantageous aspects of the invention, the measurement system includes one or more of the following features, taken separately or in all technically possible combinations:

- the primary dopant is thulium and/or europium, the secondary dopant being ytterbium or samarium, respectively;
- the measurement system further includes a thermal neutron barrier layer intended to be arranged between the moderation layer and the external surface of the wall of the vessel, the thermal neutron barrier layer preferably being made of cadmium;
- the analysis device is configured, for each detector, so as to determine, by time-domain reflectometry or by frequency-domain reflectometry, from the detected secondary response wave, an attenuation profile of the corresponding optical waveguide, at the secondary wavelength, according to a position along the optical waveguide, the analysis device being configured to calculate the piece of information relating to the concentration of secondary dopant from the attenuation profile at the determined secondary wavelength;
- the analysis device is also configured, for each detector, so as to:
  - inject, into the corresponding optical waveguide, one or two optical complementary secondary interrogation waves each having a complementary secondary wavelength corresponding to a respective foot of the absorption peak associated with the secondary wavelength;
  - for each complementary secondary interrogation wave, detect a corresponding complementary secondary response wave emitted by the corresponding optical waveguide; and
  - determine, by time-domain reflectometry or by frequency-domain reflectometry, from each detected complementary secondary response wave, an attenuation profile of the corresponding optical waveguide, at the complementary secondary wavelength, according to a position along the optical waveguide, the analysis device being configured to calculate the piece of information relating to the concentration of secondary dopant from the result of a correction of the attenuation profile at the secondary wavelength by the attenuation profile associated with each complementary secondary wavelength;
- the analysis device is configured, for each detector, so as to determine, from the detected secondary response wave, a secondary total amount of fluorescence light emitted by the corresponding optical waveguide over its entire length, in a secondary fluorescence spectral band associated with the secondary dopant, the piece of information relating to the concentration of secondary dopant in the corresponding optical waveguide being calculated from the total secondary amount;
- for each detector, the primary dopant is also capable of being transformed into a tertiary dopant by irradiation by a photon, the tertiary dopant having the same atomic number as the primary dopant but a different valence, the analysis device also being configured, for each detector, so as to:
  - inject, into the corresponding optical waveguide, an optical tertiary interrogation wave having a tertiary wavelength at which the tertiary dopant has an absorption peak, the tertiary wavelength being such that the smallest difference between the tertiary wavelength and a wavelength corresponding to an absorption peak of the primary dopant or of the secondary dopant is greater than or equal to a third predetermined minimum difference;
  - detect a tertiary response wave emitted by the corresponding optical waveguide from the tertiary interrogation wave;
  - calculate, from the detected tertiary response wave, a piece of information relating to a concentration of tertiary dopant; and
  - determine, based on the piece of information relating to the concentration of tertiary dopant, and the conversion data, a dose of photon radiation absorbed by the wall of the vessel for a predetermined tertiary period;
- the tertiary dopant is divalent thulium and/or divalent europium, the primary dopant being trivalent thulium or trivalent europium, respectively;
- the analysis device is configured, for each detector, so as to determine, by time-domain reflectometry or by frequency-domain reflectometry, from the detected tertiary response wave, an attenuation profile of the corresponding optical waveguide, at the tertiary wavelength, according to a position along the optical waveguide, the analysis device being configured to calculate the piece of information relating to the concentration of tertiary dopant from the attenuation profile at the tertiary wavelength;
- the analysis device is also configured, for each detector, so as to:
  - inject, into the corresponding optical waveguide, one or two optical complementary tertiary interrogation waves each having a complementary tertiary wavelength corresponding to a respective foot of the absorption peak associated with the tertiary wavelength;
  - for each complementary tertiary interrogation wave, detect a corresponding complementary tertiary response wave emitted by the optical waveguide; and
  - determine, by time-domain reflectometry or by frequency-domain reflectometry, from each detected complementary tertiary response wave, an attenuation profile of the corresponding optical waveguide, at the complementary tertiary wavelength, according to a position along the optical waveguide, the analysis device being configured to calculate the piece of information relating to the concentration of tertiary dopant from the result of a correction of the attenuation profile at the tertiary wavelength by the attenuation profile associated with each complementary tertiary wavelength;
- the analysis device is configured, for each detector, so as to determine, from the detected tertiary response wave, a total tertiary amount of fluorescence light emitted by the corresponding optical waveguide over its entire length, in a tertiary fluorescence spectral band associated with the tertiary dopant, the piece of information relating to the concentration of tertiary dopant in the corresponding optical waveguide being calculated from the total tertiary amount.

Furthermore, the object of the invention is an installation comprising a nuclear reactor and a measurement system as defined above, each detector being disposed on an external surface of a wall of a vessel of the nuclear reactor and, for each detector, the moderation layer being arranged between the corresponding optical waveguide and the external surface.

Furthermore, the object of the invention is a method for measuring fast neutron fluence for a nuclear reactor, implementing at least one detector comprising:
an optical waveguide including a primary dopant capable of transmuting, by neutron capture, into a secondary dopant, the secondary dopant having an atomic number different from that of the primary dopant, the secondary dopant being stable and being less neutron-absorbent than the primary dopant;
a moderation layer suitable for slowing down fast neutrons and arranged between the optical waveguide and an external surface of a wall of a reactor vessel,
the measurement method comprising, for each detector, the steps:
injection, into the corresponding optical waveguide, of a secondary interrogation wave having a secondary wavelength at which the secondary dopant has an absorption peak, the smallest difference between the secondary wavelength and a wavelength corresponding to an absorption peak of the primary dopant being greater than or equal to a predetermined minimum difference;
detection of a secondary response wave emitted by the corresponding optical waveguide from the secondary interrogation wave;
calculation, from the detected secondary response wave, of a piece of information relating to a concentration of secondary dopant in the corresponding optical waveguide; and
based on the piece of information relating to the calculated concentration of secondary dopant, and conversion data relating to the nuclear reactor, determination of a fast neutron fluence experienced by the wall of the vessel for a predetermined secondary period.

Furthermore, the object of the invention is a computer program product comprising program code instructions which, when executed by a computer, implement the calculation and determination steps of the measurement method as defined above.

BRIEF DESCRIPTION OF THE DRAWINGS

The invention will be better understood using the following description, given only by way of non-limiting example and made with reference to the appended drawings wherein.

DETAILED DESCRIPTION

Figure 1:
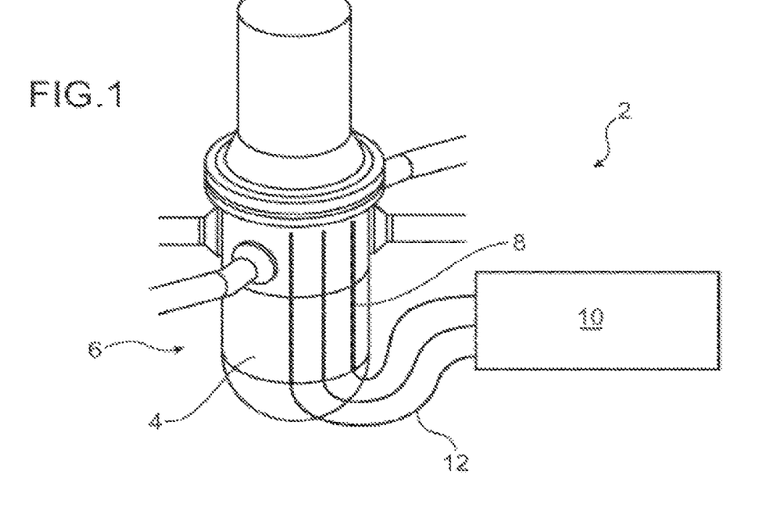
FIG. 1 is a schematic representation of a nuclear reactor vessel equipped with a measurement system according to the invention.
Figure 2:
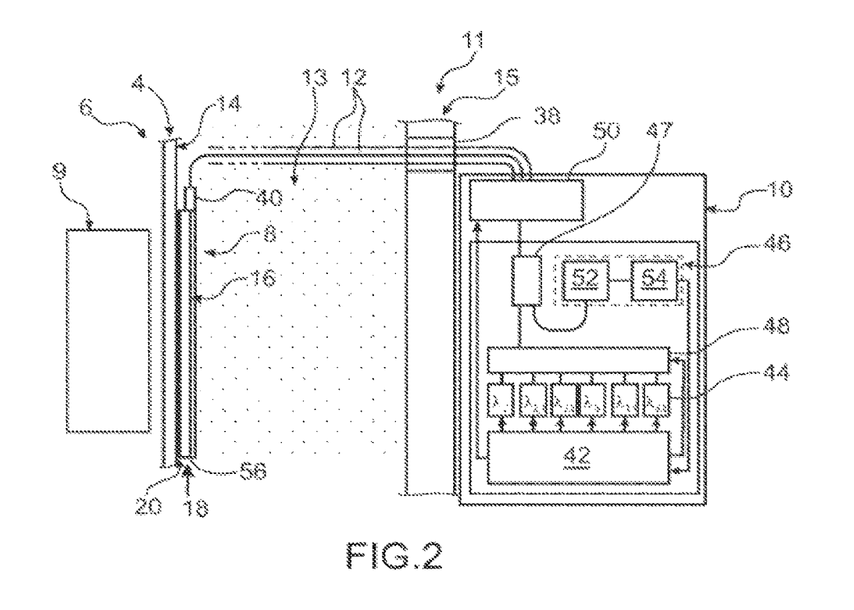
FIG. 2 illustrates in more detail the vessel and the measurement system of FIG. 1.

A measurement system 2 according to the invention is illustrated by FIGS. 1 and 2.

The measurement system 2 is intended to measure a neutron fluence, and more specifically a fast neutron fluence, experienced by a wall 4 of a vessel 6 of a nuclear reactor (not shown). The vessel 6 houses the core 9 of the reactor.

Conventionally, the vessel 6 is housed in a reactor building 11, an envelope 13 made of heat-insulating material being arranged between the wall 4 of the vessel 6 and a partition 15 of the reactor building 11.

The measurement system 2 comprises at least one detector 8 and an analysis device 10 connected to each detector 8. In particular, the analysis device 10 is connected to each detector 8 by means of a corresponding offset fibre 12.

As illustrated by these figures, each detector 8 is intended to be arranged on an external surface 14 of the wall 4, and is configured to have a response which depends on the fast neutron fluence experienced by the wall 4 in the vicinity of the detector 8.

Furthermore, the analysis device 10, preferably disposed outside the reactor building 11, is configured to determine said fast neutron fluence over a predetermined secondary period, from the response of each detector 8.

Detector

The detector 8 comprises an optical waveguide 16, also called "waveguide", a moderation layer 18 and, preferably, a thermal neutron barrier layer 20.

Waveguide

The waveguide 16 is suitable for transporting and guiding light having a wavelength belonging to a predetermined range of wavelengths, preferably a range of wavelengths belonging at least partially to the visible range and/or in the near infrared range.

In particular, the waveguide 16 is a light guide fibre. For example, the waveguide 16 is a silica optical fibre or crystal fibre, preferably aluminium oxide $Al_2O_3$ crystal fibre (also called "sapphire"), yttrium aluminium garnet (commonly called "YAG"), or calcium fluoride $CaF_2$. Such fibres have excellent resistance to radiation, which is advantageous for the intended application.

Preferably, and as shown in FIG. 1, the waveguide 16 has a length which is of the same order of magnitude as a spatial extent of the vessel 6, preferably between 0.5 m and 20 m, for example between 1 m and 10 m. This allows the determination of a neutron fluence profile (or of a total neutron fluence) over an extended area of the wall 4, which increases the significance of the measurement.

In order to reduce a reflection at a distal end 56 of the waveguide 16, distinct from the end connected to the corresponding offset fibre 12, an index adaptation at said distal end 56 is advantageously carried out. For this purpose, an index liquid whose optical index is identical to that of the waveguide 16 can be deposited at said distal end, or else this distal end can be cleaved or polished obliquely (typical angle of 8°).

The waveguide 16 includes a primary dopant capable of transmuting, by thermal neutron capture, into a secondary dopant. Such a transmutation reaction is conventionally called an "(n, γ) reaction".

The secondary dopant is stable and has a different atomic number than the primary dopant. Also, the secondary dopant is less neutron-absorbent than the primary dopant.

By "secondary dopant less neutron-absorbent than the primary dopant", it is understood, within the meaning of the present invention, that the secondary dopant has a thermal neutron capture cross section smaller than that of the primary dopant for neutrons of given energy, in particular for thermal neutrons, advantageously at least five times smaller, preferably at least ten times smaller, for example at least twenty times smaller.

Such a feature is particularly advantageous, in so far as, at the first order, the amount of secondary dopant in the waveguide 16 depends only on the transmutation of the primary dopant by neutron capture, and constitutes a reliable indicator thereof.

Indeed, during the operation of the measurement system 2, the primary dopant is gradually transmuted into secondary dopant, under the effect of neutrons coming from the core 9 and passing through the wall 4 of the vessel 6. The secondary dopant thus obtained is stable, so that it does not transform spontaneously, by nuclear reaction, into one of its isotopes or into another chemical element. Furthermore, the secondary dopant being less neutron-absorbent than the primary dopant, the probability of a transmutation, by capture of a neutron, of the secondary dopant (which is itself resulting from a previous reaction of the primary dopant) is very low. Furthermore, the concentration of secondary dopant being low (of the order of parts per million, ppm), the concentration of the product of the reduction, under the effect of photons coming from the core 9, of the secondary dopant is neglected.

As will be described later, by interrogating each detector 8, a piece of information relating to the concentration of secondary dopant is obtained, this value being indicative of a thermal neutron fluence seen by the detector 8 when used. By implementing predetermined conversion data relating to the reactor, a fast neutron fluence experienced by the wall 4 of the vessel 6 is thus likely to be obtained.

Advantageously, the primary dopant is thulium (denoted Tm) and/or europium (denoted Eu).

The secondary dopant corresponding to thulium is ytterbium (denoted Yb). Furthermore, the secondary dopant associated with europium is samarium (denoted Sm).

Thulium has a single isotope $^{169}$Tm, the transmutation of which leads to the stable ytterbium 170 $^{170}$Yb.

Thulium has a neutron capture cross section of 112 barn at 25 meV, and 7.4 barn at 1 MeV. The thermal neutron capture cross section of ytterbium is an order of magnitude smaller than that of thulium.

Europium has two natural isotopes, $^{151}$Eu and $^{153}$Eu, in equal proportions. The transmutation of europium leads to the formation of the isotopes $^{152}$Sm and 148Sm, whose thermal neutron capture cross sections are two to three orders of magnitude below europium.

The neutron capture cross sections at 25 meV of $^{151}$Eu and $^{153}$Eu are 9189 barn and 367 barn respectively, but are only about 7 barn at 1 MeV.

Such chemical species are advantageous in so far as, with regard to the usual ex-core neutron fluxes, the transmutation of thulium and europium does not significantly modify their concentration over periods of several decades.

By way of illustration, in a silica optical fibre or a sapphire fibre, thulium is present in the form of an oxide $Tm_2O_3$, while europium is present in the form of an oxide $Eu_2O_3$.

Figure 3:
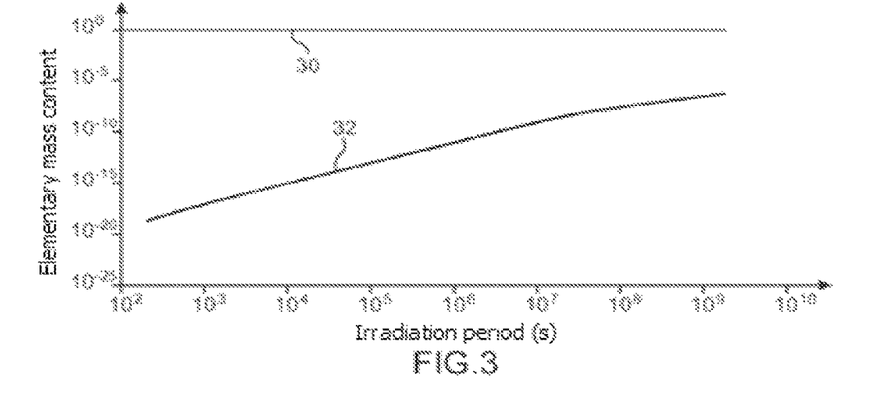
FIG. 3 is a graph illustrating the evolution, as a function of time, of a mass content of the elements thulium and ytterbium in a detector of the measurement system of FIGS. 1 and 2.

By way of example, FIG. 3 illustrates the evolution, as a function of time, of a mass content of the elements thulium (curve 30) and ytterbium (curve 32) in a detector 8 doped with thulium and exposed to a thermalised fast neutron flux equal to $3.10^6$ n·cm$^{-2}$·s$^{-1}$. Such a neutron flux is typically that prevailing at the external surface of the wall of the vessel of a PWR 1300 reactor, and of which the moderation layer 18 has a thickness of about 10 cm.

As shown in this figure, the mass content of ytterbium gradually increases over time due to the transmutation of thulium, with a content estimated at approximately 3.6 ppb (parts per billion) after a service life of 3 years ($9.46.10^7$ s), and about 72 ppb after a service life of 60 years ($1.89.10^9$ s), for a concentration of primary dopant of 8%. Consequently, the mass content of thulium is, at the first order, constant over the entire lifetime of the detector 8.

Such contents are compatible with a measurement by means of the measurement system according to the invention.

Figure 4:
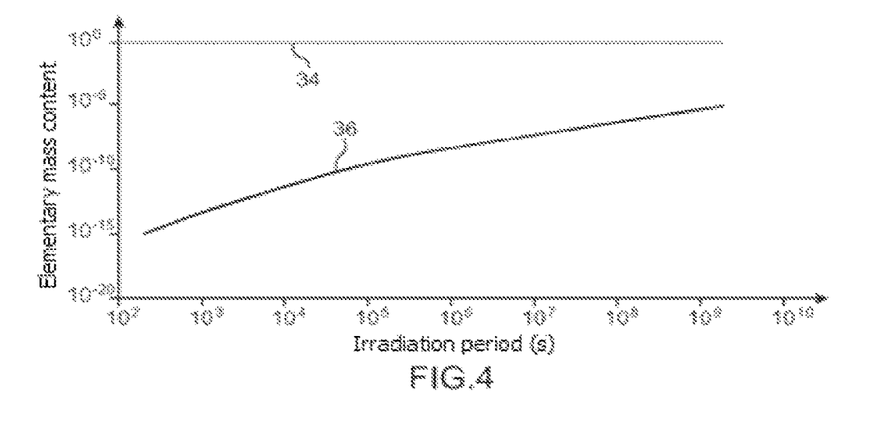
FIG. 4 is a graph illustrating the evolution, as a function of time, of a mass content of the elements europium and samarium in a detector of the measurement system of FIGS. 1 and 2.

According to another example, FIG. 4 illustrates the evolution, as a function of time, of a mass content of the elements europium (curve 34) and samarium (curve 36) in a detector 8 doped with europium and exposed to the same neutron flux as in the example of FIG. 3.

This figure shows that the mass content of samarium increases gradually over time due to the transmutation of europium, with an estimated content of around 40 ppb after a period of use of 3 years, and about 800 ppb after a service life of 60 years, for a concentration of primary dopant of 8%. In this case, the mass content of europium is, at the first order, constant over the entire lifetime of the detector 8.

Such contents are compatible with a measurement by means of the measurement system according to the invention.

Advantageously, the primary dopant is also capable of being transformed into a tertiary dopant by irradiation with a photon, in particular a high-energy photon (typically greater than one kiloelectronvolt), for example a γ photon. The tertiary dopant has the same atomic number as the primary dopant, but a different valence.

This is particularly advantageous, since, at the first order, the amount of tertiary dopant in the waveguide 16 depends only on the reduction of the primary dopant by absorption of high energy photons. As a result, the amount of tertiary dopant in the waveguide 16 is an indicator of absorbed photon radiation dose.

Indeed, during the operation of the measurement system 2, the primary dopant gradually undergoes, under the effect of the photons (in particular γ photons) coming from the core 9 and passing through the wall 4 of the vessel 6, a reduction whose product is the tertiary dopant. The concentration of product of the subsequent transmutation of the tertiary dopant is neglected, in so far as the appearance of this product requires the implementation, from the primary dopant, of two successive reactions (transmutation, then reduction), each having a low probability.

However, as will be described later, by interrogating each detector 8, a piece of information relating to the concentration of tertiary dopant is obtained, this value being indicative of a dose of absorbed photon radiation (that is to say a dose of radiation absorbed due to photons) by the detector 8 during a predetermined tertiary period. By implementing the predetermined conversion data, a dose absorbed by the wall 4 of the vessel 6 is thus likely to be obtained. This results from the fact that the primary dopant and the tertiary dopant have localised light absorption peaks at different wavelengths, their valences being different.

The tertiary dopant corresponding to thulium in its trivalent state is divalent thulium. Also, the tertiary dopant associated with europium in its trivalent state is divalent europium.

Preferably, the doping, by the primary dopant, of the waveguide 16 before the first implementation of the measurement system 2 is of the order of a few percent, advantageously comprised between 1% and 25% molar, for example approximately 8% molar.

In general, and as will be described later, a given waveguide 16 generates a response wave when receiving an interrogation wave.

The generic expressions "interrogation wave" and "response wave" will be used in the description of the measurement system 2, unless the description of certain features calls for the use of more precise expressions.

More specifically, upon receiving the secondary interrogation wave (described later), the waveguide 16 generates a secondary response wave.

Upon receiving the tertiary interrogation wave (described later), the waveguide 16 generates a tertiary response wave.

When receiving the first, respectively the second, complementary secondary interrogation wave (described later), the waveguide 16 generates a first, respectively a second, complementary secondary response wave.

When receiving the first, respectively the second, complementary tertiary interrogation wave (described later), the waveguide 16 generates a first, respectively a second, complementary tertiary response wave.

Moderation Layer

The moderation layer 18, shown in FIG. 2, is configured to slow down fast neutrons, in particular to thermalise them. In other words, the moderation layer 18 is configured to convert at least some of the incident fast neutrons into thermal neutrons, that is to say having an energy less than or equal to 1 eV (electronvolt).

As shown in FIG. 2, the moderation layer 18 is intended to be arranged between the waveguide 16 and the external surface 14 of the wall 4.

Thanks to the moderation layer 18, the fast neutrons coming from the core 9 and crossing the wall 4 are slowed down, which allows their capture by the primary dopant (whose neutron capture cross section is generally much higher for thermal neutrons than for fast neutrons), hence its transmutation into a secondary dopant.

The moderation layer 18 is advantageously made of a hydrogen-rich material, for example polyethylene or polypropylene. Such polymers have good behaviour for temperatures ranging up to 140° C. and doses ranging up to approximately 1 MGy (megagray), that is to say typically the temperature, respectively the dose integrated over 60 years, at the external surface 14 of the wall 4.

The moderation layer 18 has a thickness comprised, preferably, between 50 mm (millimetre) and 150 mm, for example approximately 100 mm for a PWR 1300 reactor.

Such a thickness corresponds to a good compromise between the flux (to be maximised) of thermal neutrons corresponding to fast neutrons having been thermalised, and the flux of thermal neutrons directly coming from the core 9, the latter not being desirable because they are also likely to be captured by the primary dopant, which would lead to a formation of secondary dopant not representative of the fast neutron fluence, and would therefore reduce the accuracy and reliability of the measurement system 2.

For example, for a PWR 1300 reactor, a moderation layer 18 with a thickness of 100 mm leads, at the output of said moderation layer 18, to a favourable ratio close to 10 between the flux of thermal neutrons resulting from fast neutrons and the flux of thermal neutrons resulting directly from the core 9, which is satisfactory from the point of view of the intended application.

Another advantageous effect of the moderation layer 18 lies in the fact that the flux of fast neutrons impacting the waveguide 16 (and the offset fibres 12) is considerably reduced compared to a situation where such a moderation layer would be absent. This results in a significant reduction in the phenomenon of radiation-induced attenuation, which is detrimental from the point of view of the transmission of the waveguide 16 and the offset fibres 12.

Neutron Barrier Layer

The barrier layer 20 is configured to stop, at least in part, the neutrons coming from the core having an energy lower than a predetermined energy threshold, in particular the thermal neutrons.

The barrier layer 20 is intended to be arranged between the moderation layer 18 and the external surface 14 of the wall 4 of the vessel 6, as shown in FIG. 2.

Thanks to such a barrier layer 20, the flux of thermal neutrons reaching the moderation layer 18, and therefore the waveguide 16, is reduced. As a result, the measurement performed by the measurement system 2 is more reliable.

Preferably, the barrier layer 20 is made of cadmium. In this case, the barrier layer 20 advantageously has a thickness comprised between 0.6 mm and 1.6 mm, for example approximately 1 mm, the attenuation of the flux of thermal neutrons by the cadmium not varying significantly over this thickness range.

Offset Fibres

As illustrated by FIGS. 1 and 2, each offset fibre 12 connects a detector 8 corresponding to the analysis device 10 to allow the circulation of light therebetween.

More specifically, each offset fibre 12 extends between the corresponding detector 8, to the waveguide 16 of which it is connected by means of a connection 40, and an optical penetration assembly 38 arranged at the partition 15 of the reactor building 11. Thus, each offset fibre 12 crosses the envelope 13 made of heat-insulating material.

The optical penetration assembly 38 is configured to transmit light through the partition 15 while preserving the tightness of the reactor building 11.

Preferably, each offset fibre 12 comprises a core, in particular made of pure silica ("pure silica-core fibre"), and a sheath arranged around the core, the sheath being doped with fluorine to give the offset fibre 12 greater resistance to radiation.

Alternatively, the core of the offset fibre 12 is also doped with fluorine in order to further increase the resistance to radiation. In this case, the fluorine concentration in the core of the offset fibre 12 is lower than that in the sheath in order to guarantee the guiding properties of the offset fibre 12. Indeed, the silica index decreases with the fluorine doping.

Analysis Device

The analysis device 10 is configured to emit, to each detector 8, an interrogation wave to cause said detector 8 to emit a corresponding response wave. The analysis device 10 is also configured to detect the response wave emitted by each detector 8 and to determine features relating to the reactor, for example the fast neutron fluence experienced by the wall 4 of the vessel 6 during the secondary predetermined period, from each secondary response wave received.

The analysis device 10 comprises a control member 42, at least one light source 44 and a detection stage 46.

The analysis device 10 also comprises a routing member 47, configured to route light from the sources 44 to the optical penetration assembly 38, and from the optical penetration assembly 38 to the detection stage 46. The routing member 47 is, for example, an optical coupler or an optical circulator.

Preferably, in the case where the analysis device 10 comprises a plurality of sources 44, the analysis device also includes an internal switch 48, arranged between an input of the routing member 47 and an output of each source 44. The internal switch 48 is configured to route, preferably selectively, light from a source 44 to the routing member 47, depending on a corresponding control generated by the control member 42. This allows to send an interrogation wave from a specific source 44 to the detectors 8.

Preferably again, in the case where the measurement system 2 comprises a plurality of detectors 8, the analysis device also includes an external switch 50, arranged between an input/output of the routing member 47 and the optical penetration assembly 38. The external switch 50 is configured to allow the selective circulation of light between the routing member 47 and a given detector 8, according to a corresponding control from the control member 42. This allows to send an interrogation wave to a specific detector 8.

Sources

Each source 44 is configured to generate an optical wave, preferably an optical wave whose wavelength belongs to the visible or near infrared range.

More precisely, for each detector 8, the analysis device 10 comprises an associated source 44, called "secondary source", configured to generate a secondary interrogation wave having a secondary wavelength. The secondary wavelength is a wavelength at which the secondary dopant associated with the detector 8 has an absorption peak. Furthermore, the secondary wavelength is such that the smallest difference between the secondary wavelength and a wavelength corresponding to an absorption peak of the primary dopant is greater than or equal to a first predetermined minimum difference.

Preferably, the first predetermined minimum difference is greater than or equal to 100 nm, advantageously greater than or equal to 150 nm.

By way of example, if the primary dopant is thulium, which, in silica, has an absorption peak at 790 nm and an absorption peak around 1180 nm, the secondary wavelength (being 920 nm or 982 nm, as will be described later) is at least 130 nm away from the absorption peak closest to the primary dopant.

If the primary dopant is also able to transform into the tertiary dopant, then the secondary wavelength is such that the smallest difference between the secondary wavelength and a wavelength corresponding to an absorption peak of the tertiary dopant is greater than or equal to a second predetermined minimum difference.

By way of example, in the case where the secondary dopant is ytterbium:
if the waveguide 16 is a silica $SiO_2$ optical fibre or a calcium fluoride $CaF_2$ crystalline fibre, the secondary wavelength is 920 nm or 982 nm;
if the waveguide 16 is a YAG fibre, the secondary wavelength is 941 nm or 970 nm.

According to another example, in the case where the secondary dopant is samarium:
if the waveguide 16 is a $SiO_2$ silica optical fibre or a YAG crystalline fibre, the secondary wavelength is 1030 nm, 1180 nm, 1290 nm or 1390 nm;
if the waveguide 16 is a calcium fluoride $CaF_2$ crystalline fibre, the secondary wavelength is 1080 nm, 1230 nm, 1400 nm or 1500 nm.

Advantageously, for a given detector 8, the analysis device 10 also comprises an associated source 44, called "first complementary secondary source", configured to generate a first complementary secondary interrogation wave having a first complementary secondary wavelength. The first complementary secondary wavelength corresponds to a foot of the absorption peak associated with the secondary wavelength. In particular, the difference between the first complementary secondary wavelength and the secondary wavelength is of the order of ten nanometres, for example comprised between approximately 10 nm and approximately 50 nm, depending on the width (for example the width at mid-height) of the absorption peak associated with the secondary wavelength.

Advantageously, for a given detector 8, the analysis device 10 also comprises an associated source 44, called "second complementary secondary source", configured to generate a second complementary secondary interrogation wave having a second complementary secondary wavelength. The second complementary secondary wavelength corresponds to a foot of the absorption peak associated with the secondary wavelength which is distinct from the foot with which the first complementary secondary wavelength is associated. In particular, the difference between the second complementary secondary wavelength and the secondary wavelength is of the order of ten nanometres, for example comprised between approximately 10 nm and approximately 50 nm, depending on the width (for example the width at mid-height) of the absorption peak associated with the secondary wavelength. For example, the first complementary secondary wavelength and the second complementary secondary wavelength are equidistant from the secondary wavelength.

It follows that, for the fluence measurement, and regardless of the secondary dopant considered, the measurement system advantageously comprises three sources 44: a secondary source (denoted $\lambda_2$ in FIG. 2), a first complementary secondary source (denoted $\lambda_{2,1}$) and a second complementary secondary source (denoted $\lambda_{2,2}$).

Preferably, for each detector 8, the analysis device 10 also comprises an associated source 44, called "tertiary source", configured to generate an optical tertiary interrogation wave having a tertiary wavelength. The tertiary wavelength is a wavelength at which the tertiary dopant associated with the detector 8 has an absorption peak. Furthermore, the tertiary wavelength is such that the smallest difference between the tertiary wavelength and a wavelength corresponding to an absorption peak of the primary dopant or of the secondary dopant is greater than or equal to a third predetermined minimum difference.

For example, in the case where the tertiary dopant is divalent thulium, if the waveguide 16 is an optical fibre made of silica $SiO_2$ or a crystalline fibre (for example, YAG fibre or calcium fluoride $CaF_2$ crystalline fibre), the tertiary wavelength is 1066 nm.

In the case where the tertiary dopant is divalent europium, the analysis device 10 preferably does not comprise an associated source 44, in so far as the absorption peak at 350 nm of the divalent europium is outside the considered visible and near infrared ranges.

Advantageously, for a given detector 8, the analysis device 10 also comprises an associated source 44, called "first complementary tertiary source", configured to generate a first complementary tertiary interrogation wave having a first complementary tertiary wavelength. The first complementary tertiary wavelength corresponds to a foot of the absorption peak associated with the tertiary wavelength. In particular, the difference between the first complementary tertiary wavelength and the tertiary wavelength is of the order of ten nanometres, for example comprised between approximately 10 nm and approximately 50 nm, depending on the width (for example the width at mid-height) of the absorption peak associated with the tertiary wavelength.

Advantageously, for a given detector 8, the analysis device 10 also comprises an associated source 44, called "second complementary tertiary source", configured to generate a second complementary tertiary interrogation wave having a second complementary tertiary wavelength. The second complementary tertiary wavelength corresponds to a foot of the absorption peak associated with the tertiary wavelength which is distinct from the foot with which the first complementary tertiary wavelength is associated. In particular, the difference between the second complementary tertiary wavelength and the tertiary wavelength is of the order of ten nanometres, for example comprised between approximately 10 nm and approximately 50 nm, depending on the width (for example the width at mid-height) of the absorption peak associated with the tertiary wavelength. For example, the first complementary tertiary wavelength and the second complementary tertiary wavelength are equidistant from the tertiary wavelength.

It follows that, for the photon radiation dose measurement, the measurement system 2:
  advantageously comprises a tertiary source (denoted $\lambda_3$ in FIG. 2), a first complementary tertiary source (denoted $\lambda_{3.1}$) and a second complementary tertiary source (denoted $\lambda_{3.2}$) if the primary dopant is thulium;
  preferably does not comprise a tertiary source, a first or a second complementary tertiary source if the primary dopant is europium.

Detection Stage

The detection stage 46 is configured to generate a detection signal representative of the detection of the response wave from each detector 8.

The detection stage 46 includes a photodetector 52 and an acquisition device 54 connected to the output of the photodetector 52.

The photodetector 52 is connected to an output of the routing member 47 to receive the response wave from each detector 8.

The photodetector 52 is configured to detect the response wave, and to deliver an electrical signal representative of said detection.

For example, the photodetector 52 is a low noise PIN photodiode, an avalanche photodiode, or else a CCD camera. Preferably, the photodetector 52 is cooled, for example by thermoelectric effect (Peltier effect), with the aim of reducing its noise level.

The acquisition member 54 is configured to generate the detection signal from the electrical signal delivered by the photodetector 52. For example, the acquisition member 54 is configured to amplify and digitise the electrical signal delivered by the photodetector 52 to generate the detection signal.

The detection signal is representative of the features of the response wave.

The photodetector 52 and the acquisition member 54 are known and will not be described further.

Control Member

The control member is configured to store predetermined conversion data. Such conversion data comprise in particular a neutron conversion coefficient (described later). Preferably, the conversion data also comprise a photonic conversion coefficient (described later), as well as an initial concentration profile of each waveguide 16 in primary dopant (or else an initial average primary dopant concentration), or another concentration profile of each waveguide 16 in primary dopant according to a position along said waveguide 16.

For example, the primary dopant concentration profile is measured by moving the waveguide 16 longitudinally and probing it transversely. Such a measurement is desirable, the concentration being generally inhomogeneous in the waveguide 16 after its manufacture.

The control member 42 is configured to control the emission of each source 44 in order to generate the corresponding interrogation wave, for example by means of an electronic interface for triggering the emissions of the sources 44. Such an electronic trigger interface advantageously provides a time reference for the acquisition of the detection signal.

Furthermore, the control member 42 is advantageously configured to control the internal switch 48 and the external switch 50 to route the interrogation wave selectively from a given source 44 to a given detector 8.

The control member 42 is also configured to acquire the detection signal delivered by the detection stage for said source 44 and said detector 8, the detection signal delivered by the detection stage 46, for example by means of a high-speed (100 mega-samples per second or more) and high-dynamic (16-bit or more) acquisition card.

The control member 42 is also configured, from the acquired detection signal, to calculate a piece of information relating to a concentration of secondary or tertiary dopant in the corresponding optical waveguide 16, for example a concentration profile.

In particular, the control member 42 is configured, for each detector 8, so as to determine an attenuation profile of the waveguide 16 corresponding to the wavelength of the interrogation wave, depending on a position along the waveguide 16, from the detection signal corresponding to the response wave received, and by optical time-domain reflectometry, and to calculate the piece of information relating to the concentration of the secondary or tertiary dopant from the determined attenuation profile. In the case of a detection by optical time-domain reflectometry, the control member 42 is configured to control the sources 44 so that they emit light in a pulsed manner. Then, each light pulse forms the interrogation wave, the spatial extent of which determines the resolution likely to be achieved.

During its propagation from the routing member 47 to the distal end 56 of the waveguide 16, part of the interrogation wave is scattered, in particular backscattered, by Rayleigh scattering. Furthermore, part of the interrogation wave is absorbed, in particular absorbed by the secondary or tertiary dopant (depending on the wavelength of the interrogation wave) in the waveguide 16, or else due to the attenuation induced by the radiation in the waveguide 16 and/or the offset fibre 12. As a result, the interrogation wave sees its optical power decrease during its propagation.

The attenuation induced by the radiations in the offset fibre 12 generally has an impact on the signal-to-noise ratio of the measurement, while the attenuation induced by the radiations in the waveguide 16 is likely to be corrected by means of a correction described later.

The part of the interrogation wave which is backscattered constitutes the response wave. In particular, the response wave corresponds to the part of the interrogation wave which is backscattered by a portion of the optical path taken by the interrogation wave, for example an offset fibre 12 or waveguide 16 portion, said portion being spatially comprised between a start and an end of the light pulse. In the case of time-domain optical reflectometry, the spatial resolution likely to be achieved when determining the attenuation profile depends on the length of the pulses, that is to say the length of said portion. For example, for a waveguide 16 consisting of a silica optical fibre, and for light pulses with a temporal width of one nanosecond, the resolution achieved is approximately 10 cm.

Figure 5:
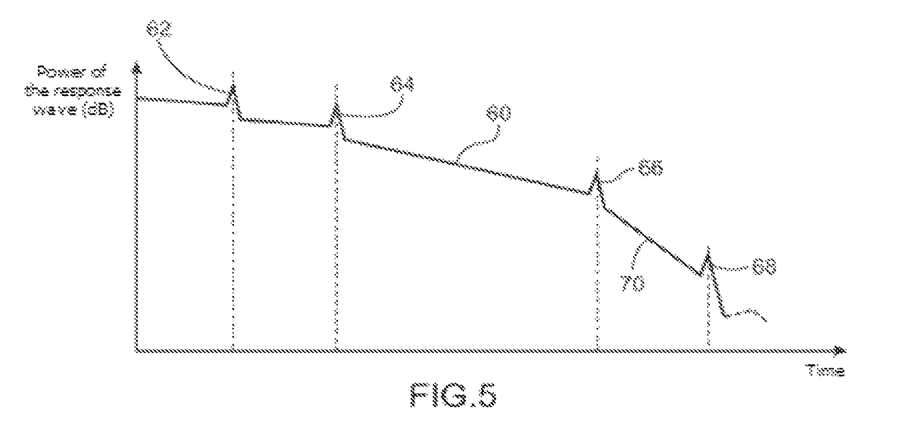
FIG. 5 is a graph illustrating the evolution, as a function of time, of a power of a response signal received from a detector of the measurement system of FIGS. 1 and 2.

An example of the evolution, as a function of time, of the power of the response wave reaching the photodetector 52 from the detector 8, after the injection of such a pulse into the routing member 47, is illustrated by the curve 60 of FIG. 5. Such a curve corresponds to the case where the interrogation wave is emitted by the secondary source or the tertiary source.

Conventionally, the detection signal delivered by the detection stage 46 is representative of such an evolution.

As shown in this figure, the power profile of the response wave is globally decreasing. As indicated previously, this results from the fact that the interrogation wave, during its propagation, sees its optical power decrease due to Rayleigh scattering, but also to absorption and coupling imperfections between successive optical components.

Furthermore, such a power profile includes peaks, corresponding to reflections at the external switch 50 (peak 62), of the optical penetration assembly 38 (peak 64) of the connection 40 (peak 66) and of the end of the waveguide 16 (peak 68).

On this curve 60, the segment 70, comprised between the peaks 66 and 68, corresponds to the part of the response wave which is due to the waveguide 16. The wavelength of the corresponding interrogation wave at an absorption peak of the secondary (respectively tertiary) dopant, the slope of the segment 70 depends on the concentration, at each point of the waveguide 16, of secondary (respectively tertiary) dopant.

As mentioned before, the response wave corresponds to the part of the interrogation wave which is backscattered. It follows that the power of the response wave at the photodetector 52, at a given instant, is representative of the power of the interrogation wave at a position associated with this instant. This is implemented for the calculation of the attenuation profile of the waveguide 16.

More specifically, the control member 42 is configured to associate the value of the detection signal, at a given instant, with a corresponding position, denoted z, along the path of the interrogation wave. The detection signal being representative of the power of the response wave, such an operation amounts to determining a power profile, denoted $P_i(z)$, of the response wave according to the position z.

In what follows, the index i equals 2 for the amounts relating to the secondary dopant, and equals 3 for the amounts relating to the tertiary dopant.

Preferably, the position z is defined relative to a reference point of known position, by implementing the relationship:

$$z = \frac{c.\Delta t}{2n} \quad (1)$$

where c is the speed of light in vacuum;

$\Delta t$ is the time elapsed between the reception of the response wave from the reference point and the reception of the response wave from the position point z; and n is the optical index of the medium traversed by the interrogation wave, for example the optical index of the waveguide 16.

For example, the position of the reference point corresponds to the position of the connection 40.

Advantageously, the control member 42 is configured to normalise the power profile $P_i(z)$ with respect to its value for a predetermined point along the path of the interrogation wave, preferably with respect to its value at the peak 66. Such normalisation eliminates the influence of attenuation variations upstream of the detector 8 (radiation-induced attenuation on the offset fibre 12, change in coupling on optical penetration assembly 38, etc.) which are not controlled in practical situation over an operational life of several decades.

Preferably, the control member 42 is configured to accumulate a plurality of power profiles obtained for a plurality of pulses emitted from the same source 44, in a given time window, for example of the order of an hour, the power profile $P_i(z)$ being equal to the result of this accumulation.

Preferably, the control member 42 is also configured to calculate, from the power profile $P_i(z)$, an attenuation profile $\alpha_i(z,\lambda_i)$ (that is to say a profile of the attenuation coefficient according to the position z), at the wavelength $\lambda_i$ of the interrogation wave.

More specifically, the control member 42 is configured to calculate the attenuation profile from the following relationship (known as the Beer-Lambert law):

$$\alpha_i(z, \lambda_i) = \frac{1}{P_i(z)} \frac{dP_i(z)}{dz} \quad (2)$$

where $\alpha_i(z,\lambda_i)$ is the attenuation coefficient (expressed in $cm^{-1}$, for example) at the position z along the waveguide 16, and at the wavelength $\lambda_i$; and d/dz is the "derivative with respect to the position z" operator.

The attenuation coefficient takes into account both absorption and scattering phenomena. However, in the context of the invention, the absorption part dominates, so that the contribution of scattering to the attenuation coefficient is neglected. It follows that, in the waveguide 16, the attenuation coefficient is comparable to an absorption coefficient.

Furthermore, the control member 42 is configured to calculate a piece of information relating to a concentration of secondary (respectively tertiary) dopant in the optical waveguide. More specifically, the control member 42 is configured to calculate a concentration profile of the secondary (respectively tertiary) dopant, in particular by implementing the relationship:

$$N_i(z) = \frac{\alpha_i(z, \lambda_i)}{\sigma_i(\lambda_i)} \quad (3)$$

where $N_i(z)$ is the concentration profile (expressed in $cm^{-3}$, for example) of the secondary (respectively tertiary) dopant; and $\sigma_i(\lambda_i)$ is the interaction section (expressed in $cm^2$, for example) of the secondary (respectively tertiary) dopant at the secondary (respectively tertiary) wavelength $\lambda_i$.

Furthermore, the control member 42 is configured to determine, from the concentration profile of the secondary dopant, a fast neutron fluence profile, denoted $\phi(z)$, by implementing the relationship:

$$\Phi(z) = K_n \frac{N_2(z)}{N_1(z)} \quad (4)$$

where $K_n$ is the predetermined neutron conversion coefficient; and $N_1(z)$ is a concentration profile of the primary dopant.

The concentration profile $N_1(z)$ is preferably predetermined (in particular, obtained by calibration according to the technique previously described) and stored in the control member 42.

Such a fast neutron fluence profile $\phi(z)$ is representative of a fast neutron fluence experienced by the wall 4 of the vessel 6, in particular during the predetermined secondary period.

The neutron conversion coefficient $K_n$ is a coefficient allowing the estimation of the fast neutron fluence in the vessel 6 (which is relevant for the estimation of the aging of the wall 4) from the measurement of the secondary dopant content in the waveguide 16 (defined as the ratio between the concentrations of secondary and primary dopants), this content reflecting an ex-core thermal neutron fluence.

The neutron conversion coefficient $K_n$ is, for example, a coefficient obtained by simulation, in particular by Monte-Carlo simulation (MCNP, TRIPOLI or MERCURE codes for example), taking into account the geometry and the composition of the core 9, as well as the features of the detector 8, for example the features of the moderation layer 18, of the barrier layer 20 or else of the waveguide 16.

Advantageously, the control member 42 is also configured to determine, from the concentration profile of the tertiary dopant, a dose profile, denoted $D(z)$, by implementing the relationship:

$$D(z) = K_p \frac{N_3(z)}{N_1(z)} \quad (5)$$

where $K_p$ is the predetermined photon conversion coefficient.

Such a dose profile $D(z)$ is representative of a dose absorbed by the wall 4 of the vessel 6 during the predetermined tertiary period.

The neutron conversion coefficient $K_p$ is a coefficient allowing the estimation of the dose absorbed by the wall 4 from the measurement of the content of tertiary dopant in the waveguide 16, this content being representative of a dose absorbed by the detector 8 outside the vessel 6.

The photonic conversion coefficient $K_p$ is, for example, a coefficient obtained by simulation, in particular by Monte-Carlo simulation (MCNP, TRIPOLI or MERCURE codes for example), taking into account the geometry and the composition of the core 9, as well as the features of the detector 8, for example the features of the moderation layer 18, of the barrier layer 20 or else of the waveguide 16.

Advantageously, for each detector 8, the control member 42 is also configured to determine, in a manner similar to what has been described above, and by means of the first associated complementary secondary source, an attenuation profile of the optical waveguide 16 corresponding to the first complementary secondary wavelength.

In this case, the control member 42 is also configured to calculate the piece of information relating to the concentration of secondary dopant from the result of a correction of the attenuation profile at the secondary wavelength by the attenuation profile at the first complementary secondary wavelength, denoted $\alpha_{2,1}(z,\lambda_{2,1})$, $\lambda_{2,1}$ designating the first complementary secondary wavelength.

More specifically, the control member 42 is configured to replace, in relation (3), the attenuation coefficient $\alpha_2(z,\lambda_2)$ by the amount $A_2(z,\lambda_2)$ obtained by:

$$A_2(z,\lambda_2) = \alpha_2(z,\lambda_2) - \alpha_{2,1}(z,\lambda_{2,1}) \quad (6)$$

Advantageously again, for each detector 8, the control member 42 is configured to determine, similarly to what has been described above:
- an attenuation profile of the optical waveguide 16 corresponding to the first complementary secondary wavelength, by means of the first complementary secondary source; and
- an attenuation profile of the optical waveguide 16 corresponding to the second complementary secondary wavelength, by means of the second complementary secondary source.

In this case, the control member 42 is also configured to calculate the piece of information relating to the concentration of secondary dopant from the result of a correction of the attenuation profile at the secondary wavelength by each of the attenuation profile $\alpha_{2,1}(z,\lambda_{2,1})$ at the first complementary secondary wavelength, and the attenuation profile at the second complementary secondary wavelength, denoted $\alpha_{2,2}(z,\lambda_{2,2})$, $\lambda_{2,2}$ designating the second complementary secondary wavelength.

More specifically, the control member 42 is configured to replace, in relation (3), the attenuation coefficient $\alpha_2(z,\lambda_2)$ by the amount $A_2(z,\lambda_2)$ obtained by:

$$A_2(z,\lambda_2) = [\alpha_2(z,\lambda_2) - \alpha_{2,1}(z,\lambda_{2,1})] + [\alpha_{2,1}(z,\lambda_{2,1}) - \alpha_{2,2}(z,\lambda_{2,2})]\frac{\lambda_2 - \lambda_{2,1}}{\lambda_{2,2} - \lambda_{2,1}} \quad (7)$$

Such a correction is advantageous, in so far as it leads to reducing the influence of attenuation variations upstream of the detector 8 (attenuation induced by the radiations on the offset fibre 12, evolution of the coupling on the optical penetration assembly 38, etc.) which are not mastered in a practical situation over an operational period of several decades. Such a correction is also capable of reducing the effect, on the attenuation profile, of an absorption of the primary dopant at the secondary wavelength.

In the case where the first and second complementary secondary wavelengths are symmetrical with respect to the secondary wavelength, the relation (7) is simplified into a relation called "Allen's correction":

$$A_2(z,\lambda_2) = \alpha_2(z,\lambda_2) - \frac{\alpha_{2,1}(z,\lambda_{2,1}) + \alpha_{2,2}(z,\lambda_{2,2})}{2} \quad (8)$$

A similar operation is considered to correct the attenuation profile at the tertiary wavelength from the attenuation profile at the first complementary tertiary wavelength, or from the attenuation profile at the first complementary tertiary wavelength and the attenuation profile at the second complementary tertiary wavelength.

The operation of the measurement system 2 will now be described.

Before the implementation of the measurement system 2, the conversion data are recorded in the control member 42.

Each detector 8 is arranged on the external surface 14 of the wall 4 of the vessel 6, the moderation layer 18 being placed between the external surface 14 and the waveguide 4.

Then, the control member 42 controls the transmission of each source 44 in order to generate the corresponding interrogation wave.

Furthermore, the control member 42 controls the internal switch 48 and the external switch 50 to route the interrogation wave selectively from a given source 44 to a given detector 8. The detection stage 46 then delivers the detection signal resulting from the detection of the corresponding response wave.

Then, from the detection signal delivered by the detection stage 46 for said source 44 and said detector 8, the control member 42 determines the power profile $P_i(z)$.

Then, the control member 42 calculates, from the power profile $P_i(z)$, the attenuation profile $\alpha_i(z,\lambda_i)$ at the wavelength $\lambda_i$ of the interrogation wave.

Then, the control member 42 calculates the concentration profile of the secondary or tertiary dopant, according to the wavelength $\lambda_i$ of the interrogation wave.

Then, the control member 42 determines:
from the concentration profile of the secondary dopant, the fast neutron fluence profile experienced by the wall 4 of the vessel 6, in particular during the predetermined secondary period (in particular the exposure period, comparable to the operational period); and/or
from the concentration profile of the tertiary dopant, the dose profile absorbed by the wall 4 of the vessel 6, in particular during the predetermined tertiary period (in particular the exposure period, comparable to the operational period).

Alternatively, the operation of the measurement system 2 is based on coherent or incoherent optical frequency-domain reflectometry. In this case, each source 44 is preferably a continuous source.

In the case of coherent optical frequency-domain reflectometry, the control member 42 is configured to control each source 44 in order to tune the wavelength of the interrogation wave that it emits.

In this case, an interference between the response wave received from a given detector 8 and a fraction of the corresponding (possibly delayed) interrogation wave is produced at an input of the photodetector 52.

In this case, the detection signal corresponds to the Fourier transform of the power profile illustrated by FIG. 5.

In this case, the control member 42 is configured to calculate the power profile as the result of the inverse Fourier transform of the detection signal.

The calculation of the fast neutron fluence and/or of the absorbed dose is done in a manner similar to what was described previously.

The use of coherent optical frequency-domain reflectometry is advantageous, in so far as the spatial resolution is much better than for time-domain optical reflectometry (typically of the order of a millimetre).

In the case of incoherent optical frequency-domain reflectometry, the control member is configured to control each source 44 so as to modulate the amplitude of the interrogation wave, its wavelength being fixed over time.

In this case, the control member 42 is configured to record the detection signal for different modulation frequencies.

Furthermore, the control member 42 is configured to calculate the power profile from the detection signals recorded for the different modulation frequencies, by implementing an inverse Fourier transform. Such a calculation is known, and will not be described further.

The use of incoherent optical frequency-domain reflectometry is advantageous, in so far as this technique is more robust than coherent optical frequency-domain reflectometry: indeed, the latter generally requires, unlike incoherent optical frequency-domain reflectometry, mechanical stabilisation in order to acquire the interference signal. Furthermore, the difficulties of maintaining the reading parameters over several decades, in order to correlate an attenuation profile determined at a given instant with the reference attenuation profile determined when the measurement system is put into service with the same optoelectronic parameters (problem of durability of the pieces of information and material), arise less in the case of incoherent optical frequency-domain reflectometry.

The calculation of the fast neutron fluence and/or of the absorbed dose is done in a manner similar to what was described previously.

According to another variant, the analysis device 10 is configured to determine, for each detector 8, the neutron fluence and/or the absorbed dose integrated over the entire length of the corresponding waveguide 16.

More specifically, the analysis device 10 is configured, for each detector 8, so as to determine, from the response wave received, a total amount of fluorescence light emitted by the corresponding optical waveguide 16 on its entire length, in a secondary (respectively tertiary) fluorescence spectral band associated with the secondary (respectively tertiary) dopant. For example, in such an analysis device 10, the detection stage 46 is an optical spectrometer.

In this case, the analysis device 10 is configured to identify, in the response wave received from a given detector 8, the part corresponding to a fluorescence of the secondary dopant (respectively of the tertiary dopant), that is that is to say the part of the response wave having a wavelength belonging to a secondary (respectively tertiary) fluorescence spectral band associated with the secondary (respectively with the tertiary dopant) dopant.

In this case, the analysis device 10 is configured to calculate the concentration of the secondary and/or tertiary dopant from the power of the corresponding fluorescence signal. Furthermore, the analysis device 10 is configured to determine the fast neutron fluence and/or the dose absorbed by the wall 4 from the calculated concentration and the corresponding conversion data. For example, such conversion data (which depend, in particular, on the average concentration of primary dopant) are established experimentally, and link the power of the fluorescence signal emitted by the waveguide 16 to the average fluence at the detector 8.

For example, in the case where the secondary dopant is ytterbium and the tertiary dopant is divalent thulium, the secondary wavelength is close to 1066 nm and the tertiary wavelength is comprised between 940 nm and 980 nm.

In this case, the analysis device 10 is configured to allocate the photons in the range [1020 nm; 1050 nm] to the ytterbium fluorescence, and photons in the range [1120 nm; 1190 nm] to the fluorescence of divalent thulium.

Such a variant is advantageous, in so far as it has a lower detection threshold than the other embodiments.

The invention claimed is:
1. A system for measuring fast neutron fluence for a nuclear reactor, comprising at least one detector and an analysis device connected to each detector,
each detector comprising:
an optical waveguide including a primary dopant capable of transmuting, by neutron capture, into a secondary dopant, the secondary dopant having an atomic number different from that of the primary dopant, the secondary dopant being stable and being less neutron-absorbent than the primary dopant; and
a moderation layer configured to slow down fast neutrons and arranged between the optical waveguide and an external surface of a wall of a reactor vessel; and
the analysis device being configured, for each detector, to:

inject, into a corresponding optical waveguide, a secondary interrogation wave having a secondary wavelength at which the secondary dopant has an absorption peak, a smallest difference between the secondary wavelength and a wavelength corresponding to an absorption peak of the primary dopant being greater than or equal to a first predetermined minimum difference;

detect a secondary response wave emitted by the corresponding optical waveguide from the secondary interrogation wave;

calculate, from the detected secondary response wave, a piece of information relating to a concentration of secondary dopant in the corresponding optical waveguide; and based on the calculated piece of information relating to the concentration of the secondary dopant, and conversion data relating to the nuclear reactor, determine a fast neutron fluence experienced by the wall of the vessel for a predetermined secondary period.

2. The measurement system according to claim 1, wherein the primary dopant is thulium and/or europium, the secondary dopant being ytterbium or samarium, respectively.

3. The measurement system according to claim 1, further including a thermal neutron barrier layer configured to be arranged between the moderation layer and the external surface of the wall of the vessel.

4. The measurement system according to claim 3, wherein the thermal neutron barrier layer is made of cadmium.

5. The measurement system according to claim 1, wherein the analysis device is configured, for each detector, to determine, by time-domain reflectometry or by frequency-domain reflectometry, from the detected secondary response wave, an attenuation profile of the corresponding optical waveguide at the secondary wavelength according to a position along the optical waveguide, and the analysis device is configured to calculate the piece of information relating to the concentration of secondary dopant from the determined attenuation profile at the secondary wavelength.

6. The measurement system according to claim 1, wherein the analysis device is also configured, for each detector, to:

inject, into the corresponding optical waveguide, one or two optical complementary secondary interrogation waves each having a complementary secondary wavelength corresponding to a respective foot of the absorption peak associated with the secondary wavelength;

for each complementary secondary interrogation wave, detect a corresponding complementary secondary response wave emitted by the corresponding optical waveguide; and determine, by time-domain reflectometry or by frequency-domain reflectometry, from each detected complementary secondary response wave, an attenuation profile of the corresponding optical waveguide at the complementary secondary wavelength according to a position along the optical waveguide, the analysis device being configured to calculate the piece of information relating to the concentration of secondary dopant from a result of a correction of the attenuation profile at the secondary wavelength by the attenuation profile associated with each complementary secondary wavelength.

7. The measurement system according to claim 1, wherein the analysis device is configured, for each detector, to determine, from the detected secondary response wave, a secondary total amount of fluorescence light emitted by the corresponding optical waveguide over its entire length in a secondary fluorescence spectral band associated with the secondary dopant, the piece of information relating to the concentration of secondary dopant in the corresponding optical waveguide being calculated from the total secondary amount.

8. The measurement system according to claim 1, wherein for each detector, the primary dopant is also capable of being transformed into a tertiary dopant by irradiation by a photon, the tertiary dopant having a same atomic number as the primary dopant but a different valence; and the analysis device is also configured, for each detector, to:

inject, into the corresponding optical waveguide, an optical tertiary interrogation wave having a tertiary wavelength at which the tertiary dopant has an absorption peak, the tertiary wavelength being such that a smallest difference between the tertiary wavelength and a wavelength corresponding to an absorption peak of the primary dopant or of the secondary dopant is greater than or equal to a third predetermined minimum difference;

detect a tertiary response wave emitted by the corresponding optical waveguide from the tertiary interrogation wave;

calculate, from the detected tertiary response wave, a piece of information relating to a concentration of tertiary dopant; and determine, based on the piece of information relating to the concentration of tertiary dopant and the conversion data, a dose of photon radiation absorbed by the wall of the vessel for a predetermined tertiary period.

9. The measurement system according to claim 8, wherein the tertiary dopant is divalent thulium and/or divalent europium, the primary dopant being trivalent thulium or trivalent europium, respectively.

10. The measurement system according to claim 8, wherein the analysis device is configured, for each detector, so as to determine, by time-domain reflectometry or by frequency-domain reflectometry, from the detected tertiary response wave, an attenuation profile of the corresponding optical waveguide at the tertiary wavelength, according to a position along the optical waveguide; and the analysis device is configured to calculate the piece of information relating to the concentration of tertiary dopant from the attenuation profile at the tertiary wavelength.

11. The measurement system according to claim 8, wherein the analysis device is also configured, for each detector, to:

inject, into the corresponding optical waveguide, one or two optical complementary tertiary interrogation waves, each having a complementary tertiary wavelength corresponding to a respective foot of the absorption peak associated with the tertiary wavelength;

for each complementary tertiary interrogation wave, detect a corresponding complementary tertiary response wave emitted by the optical waveguide; and determine, by time-domain reflectometry or by frequency-domain reflectometry, from each detected complementary tertiary response wave, an attenuation profile of the corresponding optical waveguide at the complementary tertiary wavelength according to a position along the optical waveguide, the analysis device being configured to calculate the piece of information relating to the concentration of tertiary dopant from a result of a correction of the attenuation profile at the tertiary wavelength by the attenuation profile associated with each complementary tertiary wavelength.

12. The measurement system according to claim 8, wherein the analysis device is configured, for each detector, to determine, from the detected tertiary response wave, a total tertiary amount of fluorescence light emitted by the corresponding optical waveguide over its entire length, in a tertiary fluorescence spectral band associated with the tertiary dopant, the piece of information relating to the concentration of tertiary dopant in the corresponding optical waveguide being calculated from the total tertiary amount.

13. An installation comprising a nuclear reactor and a measurement system according to claim 1, each detector being disposed on an external surface of a wall of a vessel of the nuclear reactor and, for each detector, the moderation layer being arranged between the corresponding optical waveguide and the external surface.

14. A method for measuring fast neutron fluence for a nuclear reactor having at least one detector comprising:
  an optical waveguide including a primary dopant capable of transmuting, by neutron capture, into a secondary dopant, the secondary dopant having an atomic number different from that of the primary dopant, the secondary dopant being stable and being less neutron-absorbent than the primary dopant; and
  a moderation layer configured to slow down fast neutrons and arranged between the optical waveguide and an external surface of a wall of a reactor vessel,
the measurement method comprising, for each detector:
  injecting, into a corresponding optical waveguide, a secondary interrogation wave having a secondary wavelength at which the secondary dopant has an absorption peak, a smallest difference between the secondary wavelength and a wavelength corresponding to an absorption peak of the primary dopant being greater than or equal to a predetermined minimum difference;
  detecting a secondary response wave emitted by the corresponding optical waveguide from the secondary interrogation wave;
  calculating, from the detected secondary response wave, a piece of information relating to a concentration of secondary dopant in the corresponding optical waveguide; and
  based on the calculated piece of information relating to the concentration of secondary dopant, and conversion data relating to the nuclear reactor, determining a fast neutron fluence experienced by the wall of the vessel for a predetermined secondary period.

15. A non-transitory computer program product comprising program code instructions which, when executed by a computer, implement the calculating and determining of the measurement method according to claim 14.

* * * * *